(12) United States Patent
Malin et al.

(10) Patent No.: US 8,651,471 B2
(45) Date of Patent: Feb. 18, 2014

(54) PART POSITIONING ASSEMBLY

(75) Inventors: Brian K. Malin, St. Louis, MO (US); Richard Lawson, St. Louis, MO (US)

(73) Assignee: The Boeing Company, Chicago, IL (US)

(*) Notice: Subject to any disclaimer, the term of this patent is extended or adjusted under 35 U.S.C. 154(b) by 1864 days.

(21) Appl. No.: 11/654,095

(22) Filed: Jan. 16, 2007

(65) Prior Publication Data
US 2008/0169594 A1    Jul. 17, 2008

(51) Int. Cl.
*B23Q 3/00* (2006.01)

(52) U.S. Cl.
USPC ............................................ 269/296; 269/55

(58) Field of Classification Search
USPC ................... 269/296, 55, 95, 73; 248/292.12, 248/292.13
See application file for complete search history.

(56) References Cited

U.S. PATENT DOCUMENTS

| | | | |
|---|---|---|---|
| 4,184,685 A * | 1/1980 | Wilson | 273/241 |
| 6,971,613 B2 * | 12/2005 | Shendelman | 248/150 |
| 7,198,236 B2 * | 4/2007 | Warner | 248/125.8 |
| 7,523,904 B2 * | 4/2009 | Carnevali | 248/278.1 |
| 7,641,156 B2 * | 1/2010 | Medders et al. | 248/125.8 |
| 2008/0169594 A1 * | 7/2008 | Malin et al. | 269/55 |

FOREIGN PATENT DOCUMENTS

WO   PCT/US2007/087554    12/2007

\* cited by examiner

*Primary Examiner* — Lee D Wilson
(74) *Attorney, Agent, or Firm* — Hanley, Flight & Zimmerman, LLC

(57) ABSTRACT

A part positioning assembly is an illustrative embodiment of the part positioning assembly includes a base, a post carried by the base and a puck detachably carried by the post.

20 Claims, 4 Drawing Sheets

PART POSITIONING ASSEMBLY

FIELD

The present invention relates to positioning assemblies for positioning parts and components, such as aircraft components, for example, for trimming, inspection and other purposes. More particularly, the present invention relates to a part positioning assembly having interchangeable pucks and pins for engaging and positioning parts and components having various sizes and shapes for non-destructive testing applications.

BACKGROUND

In many industries, fabrication of parts or components requires that the parts and components be trimmed or inspected such as using ultrasonic means. This requires that the parts and components be repeatably positioned in a precise manner with a minimum of contact area between a support and the part or component being positioned. Generally, tools which are being used for this purpose require a specific tool for a specific part or for specific features in each part. Some tools cover inspectable areas on the part and require multiple part tooling positions and multiple inspection scans for a single part. The requirement of specific tools for specific parts and multiple scan positions increases cost by increasing the number of tools and time which are required to process the parts. Furthermore, finding specific tools for specific parts is time-consuming.

SUMMARY

The present invention is generally directed to a part positioning assembly which includes single, dual or multiple adjustable assemblies in contact with the part. An illustrative embodiment of the part positioning assembly includes a base, a post carried by the base and a puck detachably carried by the post.

BRIEF DESCRIPTION OF THE DRAWINGS

The invention will now be described, by way of example, with reference to the accompanying drawings, in which.

DETAILED DESCRIPTION

Figure 1:
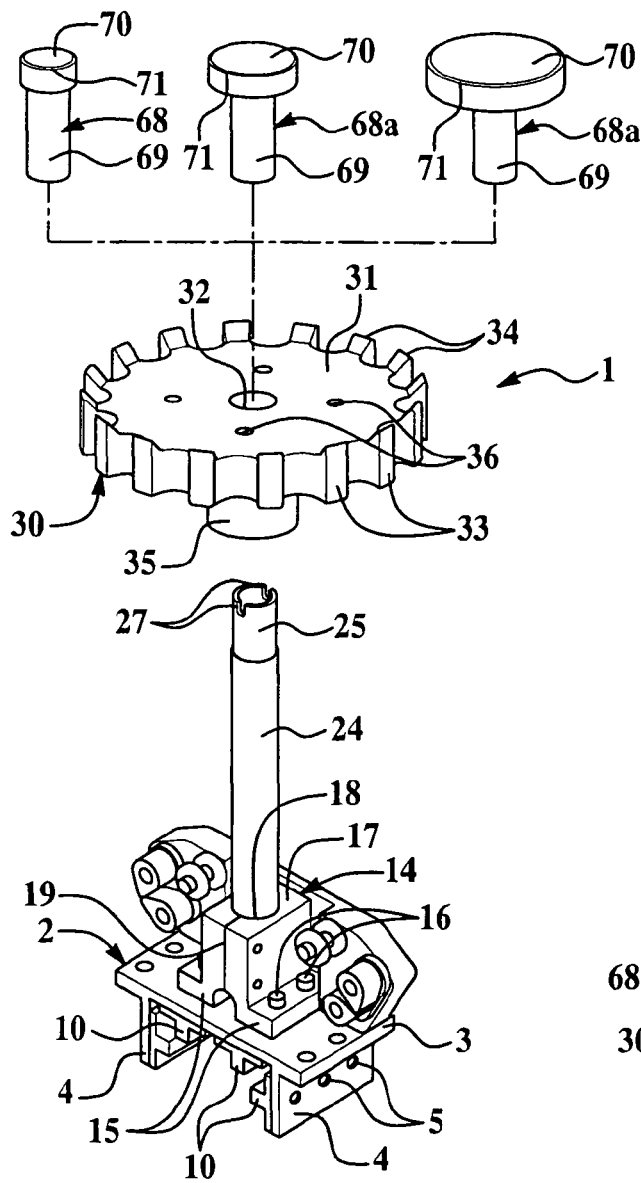
FIG. 1 is an exploded, perspective view of an illustrative embodiment of the part positioning assembly.
Figure 2:
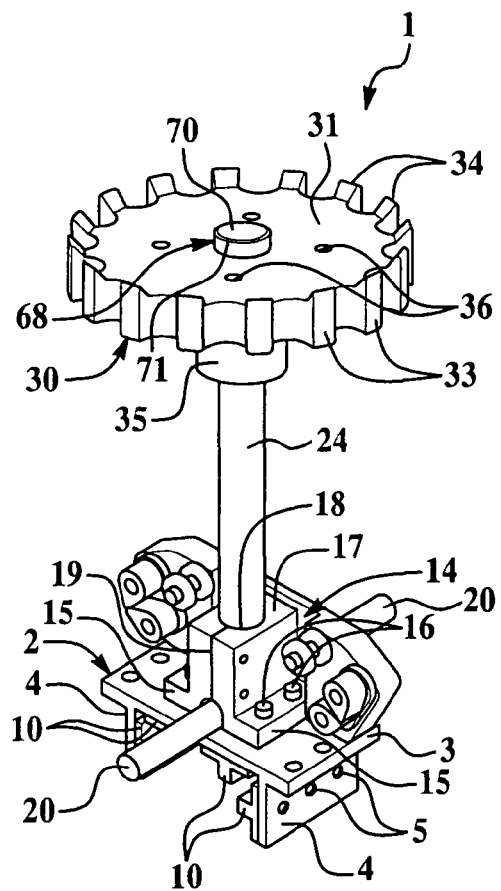
FIG. 2 is a perspective view of an illustrative embodiment of the part positioning assembly.
Figure 3:
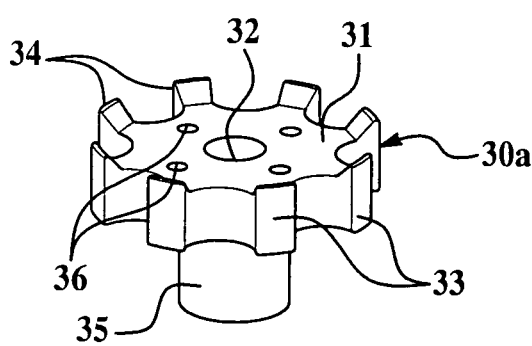
FIGS. 3-12 are perspective views of various interchangeable pucks and puck pins which are suitable for implementation of an illustrative embodiment of the part positioning assembly.

Referring initially to FIGS. 1 and 2 of the drawings, an illustrative embodiment of the part positioning assembly, hereinafter assembly, is generally indicated by reference numeral 1. The assembly 1 includes a base 2. An elongated post 24, typically having a narrowed distal end 25 which has a uniform diameter turned on the end to hold the tolerance, extends from the base 2. In some embodiments, a pin slot 27 is provided in the distal end 25 for purposes which will be hereinafter described. The base 2 may have any suitable design which is capable of supporting the post 24 and allows adjustment between posts 24 of adjacent assemblies 1. In some embodiments, the base 2, which may be a Bosch bearing truck with modified plastic bearings, includes an elongated base plate 3. A pair of generally parallel, spaced-apart base flanges 4 extends from the base plate 3. Multiple engaging members 10, each of which typically has a T-shaped cross-section, extend from the bottom or interior surface of the base plate 3 and the interior or facing surfaces of the base flanges 4. Each of the engaging members 10 may be attached to the corresponding base flange 4 by extending fasteners (not shown) through fastener openings 5 provided in each base flange 4 and through registering fastener openings (not shown) provided in each engaging member 10. The engaging members 10 may be attached to the base plate 3 in a similar manner. In some embodiments, an adjustable t-nut (not shown) and ratcheting lock handle (not shown) are provided on the base 2. The base 2 can be mounted on a rail or track system (not shown) for transport thereon, in which rail or track system a rail or track (not shown) extends between the base flanges 4 of the base 2.

A block 14, which may be a modified 80/20 inc stanchion block, for example, is provided on the base 2. The block 14 includes a pair of block flanges 15 which can be attached to the base plate 3 of the base 2 using multiple block fasteners 16, for example. A block body 17 extends from the block flanges 15. A post opening 18 extends through the block body 17. A block slot 19 extends through the block body 17 and communicates with the post opening 18. The post 24 is clamped in the post opening 18 and extends from the block body 17 of the block 14. As shown in FIG. 2, a dowel pin 20 is extended through a pin opening (not numbered) provided in the block body 17 and into the post 24 clocks the post 24 relative to the block body 17 and adjustable base rail (not shown).

Figure 5:
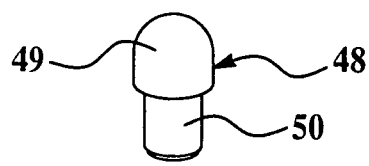
Figure 6:
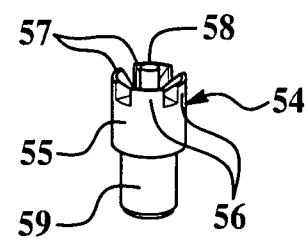

As shown in FIGS. 1 and 2, a puck 30 is detachably fitted on the distal end 25 of the post 24. The puck 30 is sized and shaped to engage and position a part or component in a manufacturing process for trimming, inspection and/or other purposes, as will be hereinafter described. Various alternative pucks are shown in FIGS. 3, 4 and 12-18 and will be hereinafter described. FIGS. 5 and 6 illustrate magnetic pin pucks 48, 54, respectively, which can be used instead of other puck/pin combinations. Magnetic pins shown in FIGS. 7-11 capture the puck on the end of the post 24 using a magnet (not shown) provided in the distal end 25 of the post 24.

The puck 30 includes a generally circular or disc-shaped puck body 31. In other embodiments, the puck 30 may be alternative shapes. A post opening or counterbore 32 extends through substantially the center of the puck body 31 to receive the distal end 25 of the post 24. Multiple contact teeth 33, each having a generally elongated contact edge 34, extend from the edge of the puck body 31, typically beyond the plane of the puck body 31 and in spaced-apart relationship with respect to each other. Alternatively, the teeth 33 may extend from other sides of the puck body 31 depending on which parts are to be positioned. The puck 30 shown in FIGS. 1 and 2 has sixteen contact teeth 33, although the number of contact teeth 33 may be greater or lesser in number. Multiple apertures 36 may be provided in the puck body 31. A mount collar 35 extends from the bottom edge of the puck body 31. A collar bore (not shown) extends through the mount collar 35 and communicates with the counterbore 32. Accordingly, the puck 30 is seated on the post 24, as shown in FIGS. 1 and 2, by inserting the distal end 25 of the post 24 through the collar opening (not shown) of the mount collar 35 and the counterbore 32 in the puck body 31.

Figure 15:
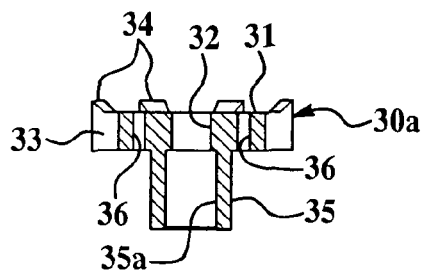
FIG. 15 is a sectional view, taken along section lines 15-15 in FIG. 14.
Figure 16:
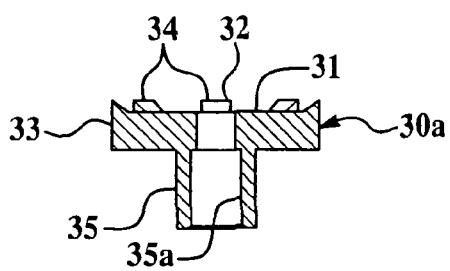
FIG. 16 is a sectional view, taken along section lines 16-16 in FIG. 14.

Referring next to FIGS. 3 and 13-16 of the drawings, an alternative puck 30a includes eight puck teeth 33. As shown in FIGS. 15 and 16, a collar bore 35a extends through the collar 35 and communicates with the counterbore 32 in the puck body 31. The apertures 36 extend completely through the puck body 31.

Figure 4:
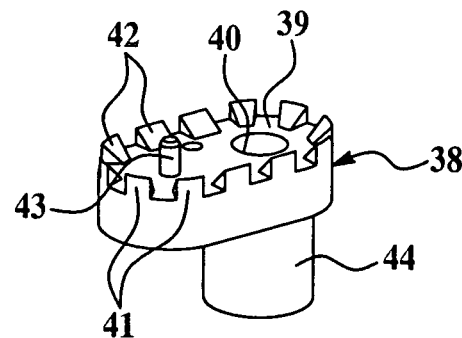
Figure 17:
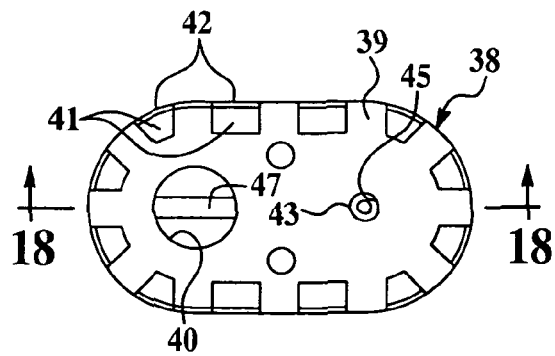
FIG. 17 is a top view of the puck shown in FIG. 4.
Figure 18:
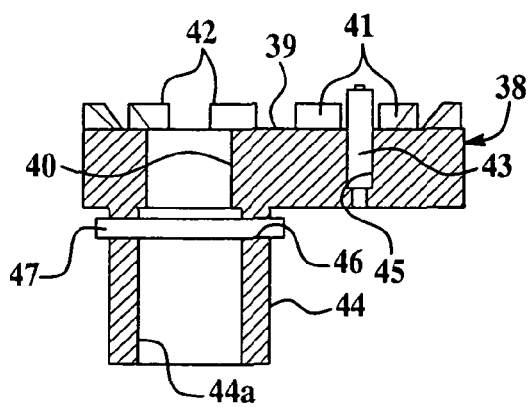
FIG. 18 is a sectional view, taken along section lines 18-18 in FIG. 17.

Referring next to FIGS. 4, 17 and 18, an alternative puck 38 includes a generally elongated, elliptical puck body 39. A post opening 40 extends through the puck body 39, adjacent to one end thereof. A mount collar 44 extends from the puck body 39. As shown in FIG. 18, a collar bore 44a extends through the mount collar 44, in aligned relationship with respect to the post opening 40. A pin 43, which may be magnetic, extends from the puck body 39, in spaced-apart relationship with respect to the post opening 40. In some embodiments, the pin 43 is seated in a pin opening 45 (FIG. 18) provided in the puck body 39. Multiple contact teeth 41, each having a generally elongated contact edge 42, extend from the edge of the puck body 39, beyond the plane of the puck body 39 and in spaced-apart relationship with respect to each other. The puck 38 is seated on the post 24 (FIGS. 1 and 2) by inserting the distal end 25 of the post 24 through the collar bore 44a and post opening 40 (FIG. 18). As shown in FIG. 18, a cross bore 46 may extend laterally through the mount collar 44, in communication with the collar bore 44a. A clocking pin 47 can be extended through the cross bore 46 and through the pin slot 27 (FIG. 1) provided in the distal end 25 of the post 24 to attach, clock or orient the mount collar 44 to the post 24 (FIGS. 1 and 2) of the assembly 1.

Referring next to FIG. 5, in another embodiment, a hemispherical puck 48 includes a generally hemispherical or dome-shaped puck body 49. A magnetic mount collar or mount pin 50 is typically threaded into a pin opening (not shown) provided in the puck body 49 and extends from the puck body 49. The magnetic pin 50 magnetically engages the distal end 25 of the post 24 to secure the puck 48 on the post 24. In some embodiments, the puck body 49 is magnetic.

Referring next to FIG. 6, in another embodiment, the puck 54 includes a generally cylindrical puck body 55. Multiple contact teeth 56, each having a generally elongated contact edge 57, are provided in an upper edge of the puck body 55. A pin 58, which may be magnetic, extends from an upper surface of the puck body 55. A magnetic pin 59 is threaded into and extends from a pin opening (not shown) provided in the bottom surface of the puck body 55.

Figure 7:
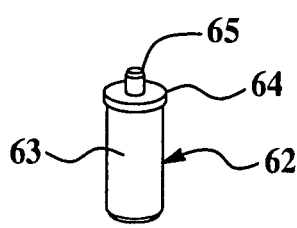
Figure 8:
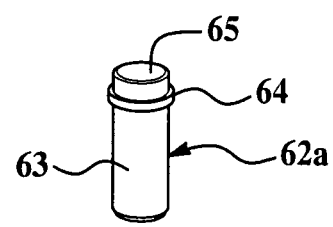

Referring next to FIG. 7, in another embodiment, a puck pin 62 includes a generally elongated, cylindrical puck pin body 63. A circular puck pin plate 64 is provided on one end of the puck pin body 63. In some embodiments, the puck pin body 63 is magnetic. The diameter of the puck pin plate 64 is greater than that of the puck pin body 63. A pin 65, which may be magnetic, extends from the puck pin plate 64. The diameter of the pin 65 may have any desired diameter and is less than that of the puck pin body 63 and of the puck pin plate 64. As shown in FIG. 8, in an alternative embodiment, the puck pin 62a has a pin 65 the diameter of which is generally equal to the diameter of the puck pin body 63.

Figure 9:
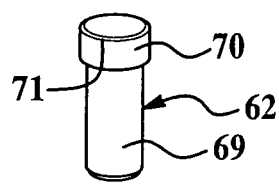
Figure 10:
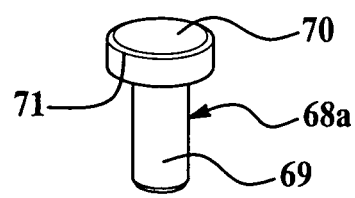
Figure 11:
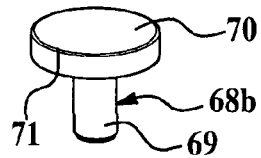

Referring next to FIG. 9-11, in another embodiment, a puck pin 68 includes a generally elongated, cylindrical puck pin body 69. A generally circular or disc-shaped puck pin head 70, the diameter of which is greater than that of the puck pin body 69, is provided on the puck pin body 69. In some embodiments, the puck pin body 69 and or puck pin head 70 is magnetic. In some embodiments, a shoulder 71 is shaped in the edge of the puck pin head 70. In alternative embodiments 68a and 68b, respectively, of the puck pin 68, shown in FIGS. 10 and 11, respectively, the puck pin head 70 has increasingly larger diameters than that of the puck pin head 70 of the puck pin 68.

Figure 12:
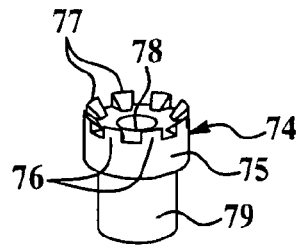
Figure 13:
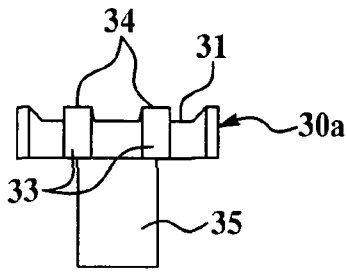
FIG. 13 is a side view of the puck shown in FIG. 3.
Figure 14:
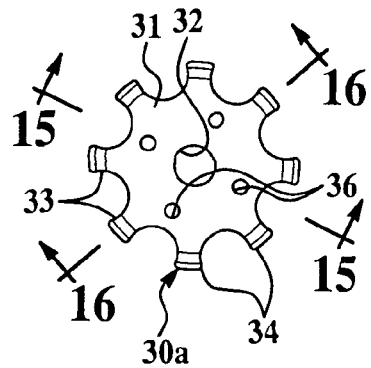
FIG. 14 is a top view of the puck shown in FIG. 3.

Referring next to FIG. 12, an alternative puck 74 which is similar in design to the puck 30a shown in FIGS. 3 and 13-16 includes a generally cylindrical puck body 75 having a diameter which is less than that of the puck body 31 of the puck 30a. Multiple contact teeth 76, each having a generally elongated contact edge 77, are provided typically in an upper edge of the puck body 75, although alternative tooth orientations are possible. A post opening 78 extends through substantially the center of the puck body 75. A mount collar 79 extends from the puck body 75. A collar bore (not shown) extends through the mount collar 79 and communicates with the post opening 78.

Referring next to FIGS. 19-22, in typical application, one or multiple assemblies 1 is/are adapted to hold and position various parts or components of an aircraft, for example, for inspection, trimming and/or other procedures which are carried out on the parts or components during fabrication, inspection and assembly of aircraft. However, it is to be understood that the assembly or assemblies 1 can be used in the positioning of parts or components for any of various purposes in any of a variety of industries. The pucks of various design which were heretofore described with respect to FIGS. 1-18 can be selected and detachably and interchangeably fitted on the post 24 (FIGS. 1 and 2) of the assembly 1 depending on the size and configuration of the component or part which is to be held and positioned using the assembly 1. The puck pins of various design which were heretofore described with respect to FIGS. 7-11 can be selected and detachably and interchangeably fitted on the puck to support the component or part. In inspection of the component or part, each puck and/or puck pin is designed to contact the component or part along a contact area (a point or line) which is smaller than the smallest size of any flaw which is to be found in the component or part. The part or component is typically retained on the end of the puck with o-ring cord stock or equivalent that is smaller than the smallest size of any flaw which is to be found in the component. The part is captured by the cord stock as it is pulled around idlers (not shown) and through cleats (not shown). In some embodiments, the puck pin is magnetic to magnetically secure the puck on the post 24 of the apparatus 1. In an alternate design, the puck can be made with a magnetic component or components to magnetically attract a magnetic part or component to hold the part or component on the puck.

Figure 19:
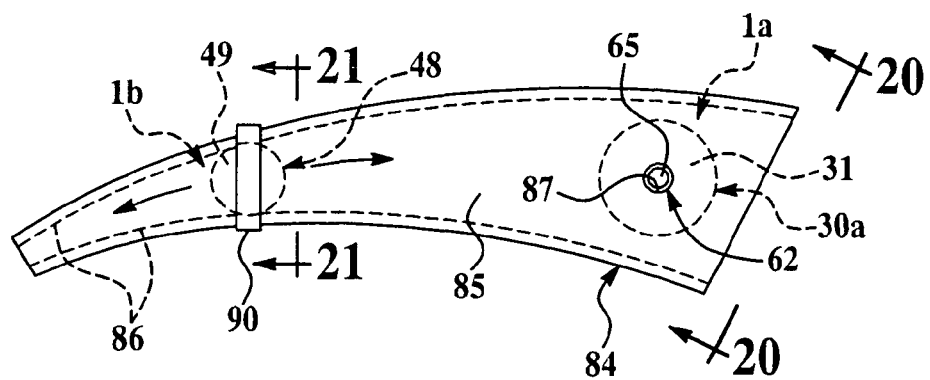
FIG. 19 is a top view of a rib, illustrating positioning of the component using a pair of part positioning assemblies.

In FIG. 19, a pair of assemblies 1 is shown supporting and positioning a rib 84 for purposes of ultrasonic inspection, trimming and/or other fabrication and/or inspection procedures which are to be carried out on the rib 84. The rib 84 shown in FIG. 19 is one example of a component part of flaperon, aileron, inboard flap and outboard flap elements of a commercial aircraft. These elements of the aircraft include 330 different ribs, spars and d-nose component parts which are amenable to positioning using one or multiple assemblies 1 during various stages of fabrication and/or inspection of the parts. The rib 84 has a generally channel-shaped design and includes a curved and tapered rib body 85 and a pair of spaced-apart rib flanges 86 which extend from the rib body 85 in generally parallel, spaced-apart relationship with respect to each other.

Figure 20:
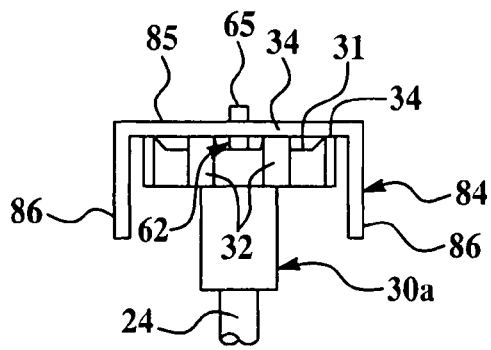
FIG. 20 is an end view, taken along lines 20-20 in FIG. 19, of a puck element of a part positioning assembly, engaging the part.
Figure 21:
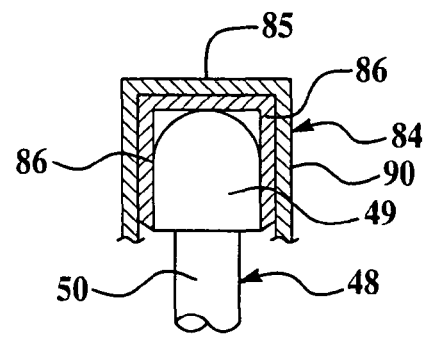
FIG. 21 is a sectional view, taken along section lines 21-21 in FIG. 19, of a puck element of another part positioning assembly, engaging the part.

In the example shown in FIGS. 19-21, a puck 30a (FIGS. 3, 6, and 12-16) is detachably fitted on the post 24 (FIGS. 1 and 2) of a first apparatus 1a. A puck pin 62 (FIG. 7), which may be magnetic, may be fitted in the counterbore 32 of the puck 30 according to the knowledge of those skilled in the art. The pin 65 of the puck pin 62 is typically about ¼" in diameter. Under circumstances in which the part has a large opening, the puck pin 62a (FIG. 8), puck pin 68 (FIG. 9), puck pin 68a (FIG. 10) or puck pin 68b (FIG. 11) can be used instead of the puck 30a. As shown in FIGS. 19 and 20, the puck 30a is positioned between the rib flanges 86 of the rib 84, at or generally adjacent to the wide end of the rib 84, with a bottom surface of the rib body 85 resting on the contact edges 34 of the respective contact teeth 33, as shown in FIG. 20. The dimensions of each contact edge 34 are typically about 0.040"×0.50". The pin 65 extends through a pin opening 87, which is typically about ¼" in diameter, provided in the rib body 85. The assembly 1a locates the height of the rib 84 and eliminates part roll moment.

A hemispherical puck 48 (FIG. 5), which is typically about 1" in diameter, is detachably fitted on the post 24 of a second apparatus 1b. As shown in FIGS. 19 and 21, the hemispherical puck 48 of the second apparatus 1b is positioned between the rib flanges 86 of the rib 84, at or generally adjacent to the narrow end of the rib 84, with the bottom surface of the rib body 85 resting on the dome-shaped puck body 49 of the hemispherical puck 48, as shown in FIG. 21. The assembly 1b can be repositioned as necessary to facilitate a secure fit of the puck body 49 between the rib flanges 86, as shown in FIG. 21. An o-ring cord 90 may be used to secure the rib 84 to the puck body 49 at assemblies 1a and 1b described above. During inspection, trimming and/or other fabrication of the rib 84, the assemblies 1a and 1b hold and position the rib 84. The hemispherical puck 48 locates the height of the rib 84 and eliminates yaw movement.

Figure 22:
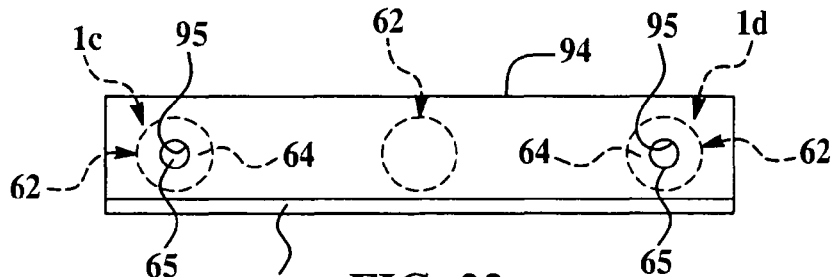
FIG. 22 is a top view of a spar, engaged by multiple part positioning assemblies.

In the example shown in FIG. 22, a third apparatus 1c and a fourth apparatus 1d are used to hold and position a spar 94 for inspection, trimming and/or other fabrication of the spar 94. A pair of spaced-apart pin openings 95 is provided in the spar 94. A puck pin 62, 62a, 68, 68a or 68b (FIGS. 7-11) is detachably fitted on the post 24 (FIGS. 1 and 2) of each apparatus 1c and 1d, respectively. Accordingly, the pin 65 and 70 of each puck pin 62, 62a, 68, 68a, 68b is inserted through the corresponding pin opening 95 of the spar 94, with the spar 94 resting on the puck teeth 34 (FIGS. 1, 2, 3 and 12) of the puck 62, 62a, 68, 68a, 68b. The center distance between apparatus 1c and 1d is adjusted to match the positions of the openings 95 in the spar 94. An O-ring cord 90 may be used to secure the spar 94 to the assemblies 1c and 1d. During inspection, trimming and/or other fabrication of the spar 94, the assemblies 1c and 1d hold and position the spar 94. It will be appreciated by those skilled in the art that the diameter of the pin 65 (FIG. 7) of the puck pin 62 and the pin 65 (FIG. 8) of the puck pin 62a, 68, 68a, 68b can vary according to the diameters of the pin openings in the component or part which is to be positioned using the assembly or assemblies 1.

Figure 23:
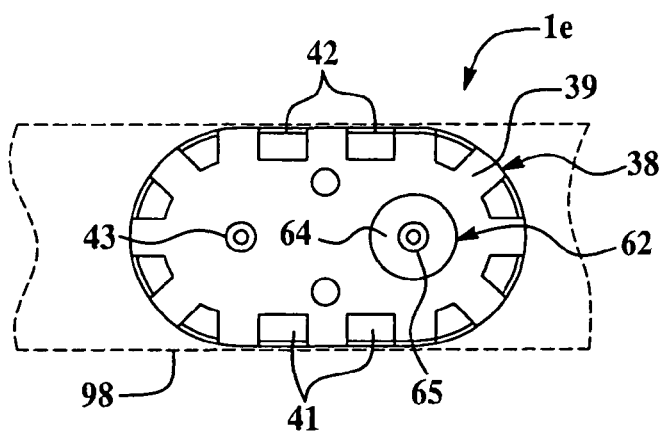
FIG. 23 is a top view of an inter-spar rib (shown in phantom), with an elongated puck supporting the inter-spar rib in typical application of the puck.

As shown in FIG. 23, in another application, an assembly 1e can be configured to support a short inter-spar rib 98 which lacks a taper. Accordingly, the elongated puck 38 (FIGS. 4, 17 and 18) is fitted on the post 24 of the assembly 1e by inserting the distal end 25 (FIG. 1) of the post 24 into the post opening 40 of the puck 38. A puck pin, such as the puck pin 62 which was heretofore described with respect to FIG. 7, may be inserted in the post opening 40 of the puck body 39. A second pin 43 is typically seated in the pin opening 45 (FIG. 18) provided in the puck body 39. The pin 65 of the puck pin 62 and the second pin 43 are typically inserted through respective pin openings (not numbered) provided in the inter-spar rib 98 as the inter-spar rib 98 is lowered to rest on the contact plate 64 (FIG. 7) of the puck pin 62. The inter-spar rib 98 may additionally rest on the contact edges 42 of the respective contact teeth 41 which extend from the puck body 39.

Although this invention has been described with respect to certain exemplary embodiments, it is to be understood that the specific embodiments are for purposes of illustration and not limitation, as other variations will occur to those of ordinary skill in the art.

What is claimed is:

1. A part positioning assembly, comprising:
   a base;
   a post carried by said base, a distal end of said post having a narrowed diameter to support a mount collar; and
   a puck comprising said mount collar detachably carried by said post;
   wherein a plurality of top surface portions of said puck have about the same height and are adapted to engage a bottom surface of said part, said part disposed on and covering said puck.

2. The assembly of claim 1 wherein said puck comprises a disc-shaped puck body and said top surface portions comprise a plurality of contact teeth having a plurality of generally elongated contact edges, respectively, extending from an edge of said puck body, beyond a plane of said puck body and in spaced-apart relationship with respect to each other.

3. The assembly of claim 2 further comprising a counterbore post opening.

4. The assembly of claim 3 further comprising said mount collar extending from said puck body in generally aligned relationship with respect to said post opening.

5. The assembly of claim 1 wherein said puck comprises a generally elongated, elliptical puck body and said top surface portions comprise a plurality of contact teeth having a plurality of generally elongated contact edges, respectively, extending from an edge of said puck body, beyond a plane of said puck body and in spaced-apart relationship with respect to each other.

6. The assembly of claim 5 further comprising a post opening extending through said puck body and a pin extending from said puck body in spaced-apart relationship with respect to each other.

7. The assembly of claim 6 further comprising said mount collar extending from said puck body in generally aligned relationship with respect to said post opening.

8. The assembly of claim 1 wherein said puck comprises a mount pin and a generally dome-shaped puck body extending from said mount pin.

9. A part positioning assembly, comprising:
a base;
a post carried by said base, a distal end of said post having a narrowed diameter to support a mount collar; and
a puck comprising said mount collar having a generally cylindrical puck body detachably carried by said post;
wherein a plurality of top surface portions of said puck body have about the same height and are adapted to simultaneously engage a bottom surface of said part, said part disposed on and covering said puck body.

10. The assembly of claim 9 wherein said top surface portions comprise a plurality of contact teeth having a plurality of generally elongated contact edges, respectively, provided in an edge of said puck body.

11. The assembly of claim 10 further comprising a puck pin extending from said puck body.

12. The assembly of claim 11 wherein said puck pin comprises a puck pin body, a generally circular puck pin plate carried by said puck pin body and a pin extending from said puck pin plate.

13. The assembly of claim 12 wherein said pin has a diameter generally equal to a diameter of said puck pin body.

14. The assembly of claim 11 wherein said puck pin comprises a puck pin body and a puck head provided on said puck pin body.

15. The assembly of claim 14 further comprising a shoulder provided in said puck head.

16. The assembly of claim 9 wherein said top surface portions comprise a plurality of contact teeth having a plurality of generally elongated contact edges, respectively, provided in an edge of said puck body;
a post opening extending through said puck body; and
said mount collar extending from said puck body in generally aligned relationship with respect to said post opening.

17. A part positioning assembly, comprising:
a base having a generally elongated base plate, a pair of spaced-apart base flanges extending from said base plate and a plurality of engaging members carried by said base plate and each of said pair of base flanges;
a post carried by said base, a distal end of said post having a narrowed diameter to support a mount collar; and
a puck comprising said mount collar detachably carried by said post;
wherein a plurality of top surface portions of said puck have about the same height and are adapted to engage a bottom surface of said part, said part disposed on and covering said puck.

18. The assembly of claim 17 wherein said puck comprises a generally cylindrical puck body.

19. The assembly of claim 18 wherein said top surface portions comprise a plurality of contact teeth having a plurality of generally elongated contact edges, respectively, provided in an edge of said puck body.

20. The assembly of claim 17 further comprising a puck pin carried by said puck.

* * * * *

UNITED STATES PATENT AND TRADEMARK OFFICE
CERTIFICATE OF CORRECTION

| | | |
|---|---|---|
| PATENT NO. | : 8,651,471 B2 | Page 1 of 1 |
| APPLICATION NO. | : 11/654095 | |
| DATED | : February 18, 2014 | |
| INVENTOR(S) | : Malin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2005 days.

Signed and Sealed this
First Day of December, 2015

Michelle K. Lee
*Director of the United States Patent and Trademark Office*